United States Patent [19]

Conerly

[11] 4,426,786

[45] Jan. 24, 1984

[54] CENTERING TOOL

[76] Inventor: Robert C. Conerly, 622 Beulah Ave., Tylertown, Miss. 39667

[21] Appl. No.: 424,871

[22] Filed: Sep. 27, 1982

[51] Int. Cl.³ .............................................. G01B 5/25
[52] U.S. Cl. ................................. 33/180 R; 33/164 R
[58] Field of Search ............ 33/174 Q, 174 R, 174 L, 33/185 R, 180 R, 191, 178 D, 163, 164; 51/238 S, 220, 239, 229, 217 R, 217 A, 217 P; 82/29

[56] References Cited

U.S. PATENT DOCUMENTS

| | | | |
|---|---|---|---|
| 2,100,649 | 11/1937 | Mossberg | 33/164 R |
| 2,416,703 | 3/1947 | Marshall | 51/217 A |
| 2,497,861 | 2/1950 | Brown | 33/164 R |
| 2,970,495 | 2/1961 | Pettigrew | 33/164 R |
| 3,859,728 | 1/1975 | Shutt | 33/180 R |

Primary Examiner—Harry N. Haroian
Attorney, Agent, or Firm—Harvey B. Jacobson

[57] ABSTRACT

A support is provided defining abutment surface portions from which one end portion of a dop stick may be supported in position paralleling and at least substantially coinciding with a predetermined axis against lateral displacement in any direction and for axial shifting relative to the support, as desired. The support defines four mounting locations spaced about the predetermined axis and disposed in a plane normal to the axis and spaced along the latter from the abutment surface portions. Elongated micrometer spindle, sleeve and thimble assemblies are supported from the mounting locations and extend along radii of the predetermined axis and the micrometer sleeve portions are supported from the corresponding mounting locations for adjustable axial shifting relative thereto. The free ends of the micrometer spindles may be spaced equally from the aforementioned axis in order to support a gem stone in centered position relative to the axis for mounting on the supported dop stick.

8 Claims, 5 Drawing Figures

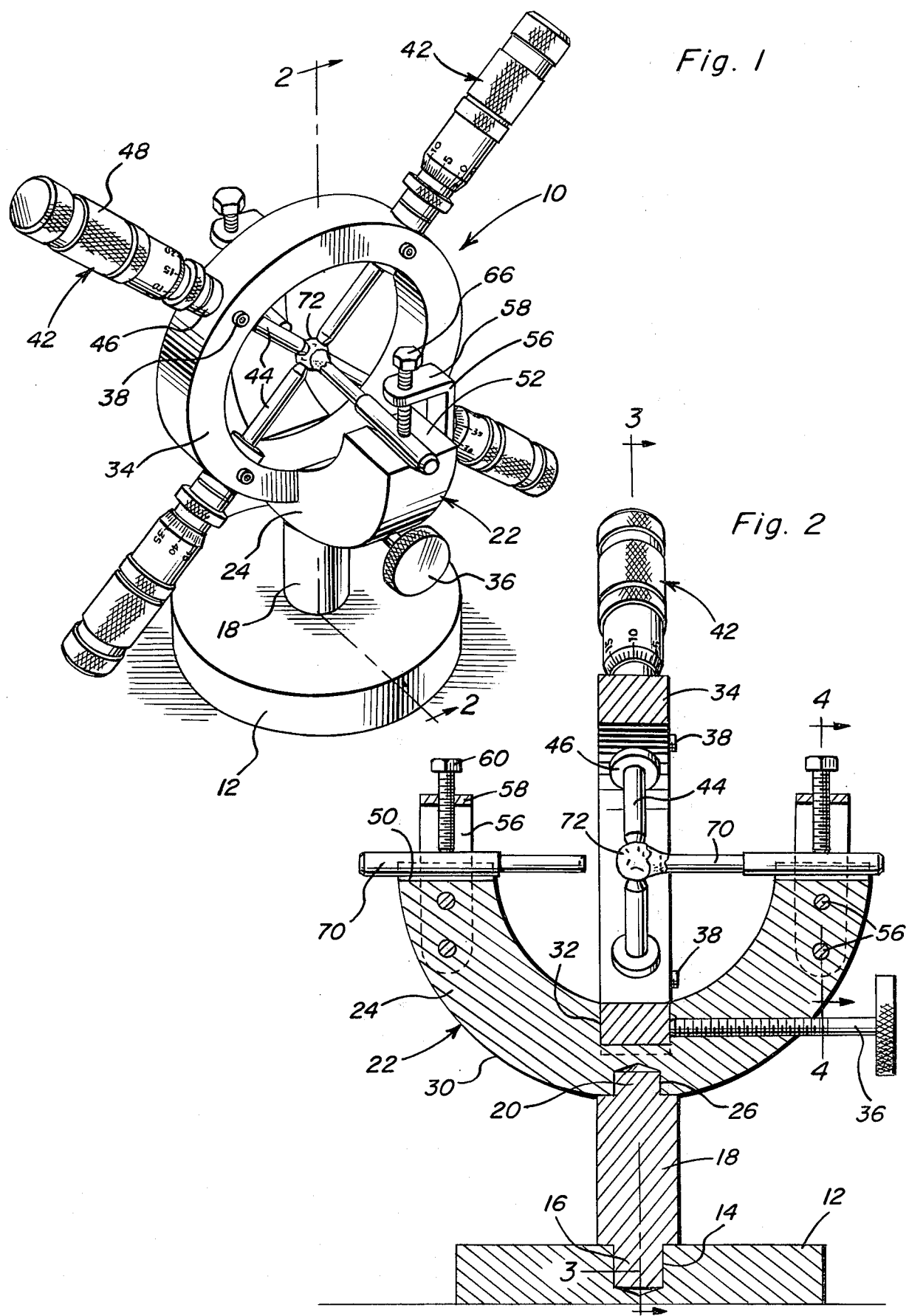

CENTERING TOOL

BACKGROUND OF THE INVENTION

When cutting precious stones the stones must be perfectly centered on an associated dop stick in order to retain maximum weight of the stone and in order to have straight, unflared facets on the stone after cutting. Although various forms of workpiece centering fixtures heretofore have been provided, most of these have not been specifically designed for use in centering a gem stone on a dop stick and those which have been adapted for such purpose have not been readily adjustable to accommodate different size stones as well as different size dop sticks. Accordingly, a need exists for a gem stone centering tool which may be utilized to center gem stones of different sizes on dop stocks of different sizes.

Examples of previously known forms of centering fixtures, including some of the general structural and operational features of the instant invention, are disclosed in U.S. Pat. Nos. 2,416,703, 2,549,332, 2,970,495 and 3,327,399.

SUMMARY OF THE INVENTION

The centering tool of the instant invention includes a base from which a circular support ring is mounted and the support ring includes four radial bores in which the sleeves of four micrometer assembles, including sleeves, spindles and thimbles may be mounted for longitudinal shifting of the sleeves radially of the ring. The four micrometer assemblies are disposed in the plane of the ring and the support includes a support block spaced laterally of the ring and defining a dop stick supporting V-groove substantially coinciding with the center axis of the ring. A perfectly straight steel dowel pin of the same diameter of the dop stick intended to be used may have the opposite ends thereof clamped in the V-grooves. Then, the thimbles of the micrometers may be set to zero and the sleeve portions thereof may be adjusted radially inwardly of the ring until the free ends of the spindles engage the dowel pin. The thimbles then may be backed off to retract the spindles and a pair of dop sticks of the same diameter may be supported in the V-notches with a gem stone to be mounted on one dop stick disposed between the free ends of the dop sticks. Thereafter the spindles are adjusted inwardly to center the gem stone relative to the dop sticks and the gem stone may be secured to the one dop stick end while the latter is supported in the corresponding V-groove.

The main object of this invention is to provide a centering tool for centering a gem stone or the like relative to a stationarily supportive dop stick whereby the gem stone may be suitably anchored to the dop stick.

Another object of this invention is to provide a centering tool which may be readily utilized in conjunction with gem stones of different sizes.

Still another object of this invention is to provide a centering tool which may be adjusted for different size dop sticks.

A further object of this invention is to provide a centering tool which may also be used for centering regular plane shaped gem stones having major and minor diameter axes relative to a dop stick to which they are to be secured.

A final object of this invention to be specifically enumerated herein is to provide a centering tool in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the centering tool with a dop stick mounted gem stone positioned in operative association with the spindles of the micrometer assemblies of the tool;

FIG. 2 is an enlarged vertical sectional view taken substantially upon the plane indicated by the section line 2—2 of FIG. 1;

DETAILED DESCRIPTION OF THE INVENTION

Figure 3:
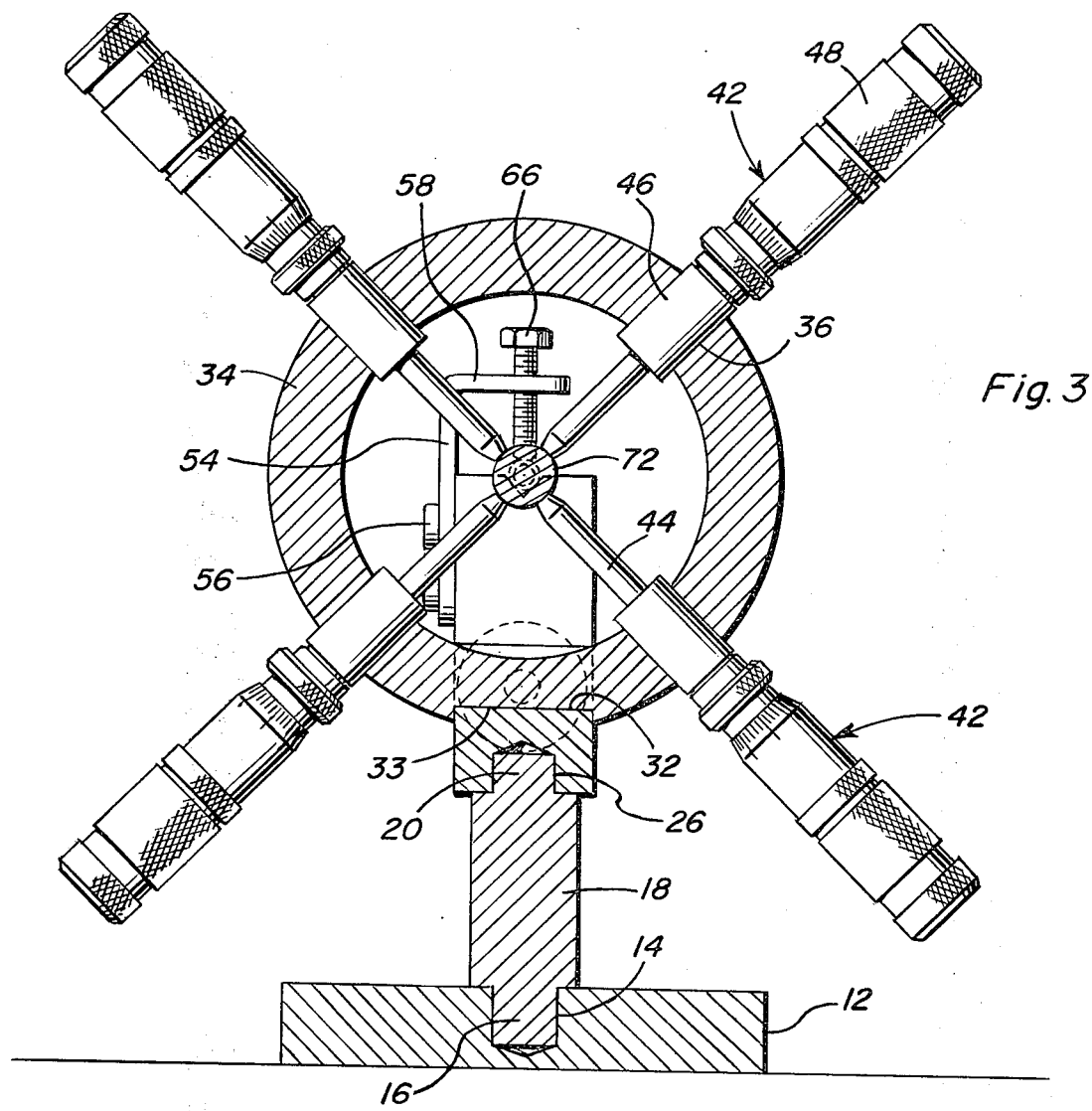
FIG. 3 is a sectional view taken substantially upon the plane indicated by the section line 3—3 of FIG. 2.
Figure 4:
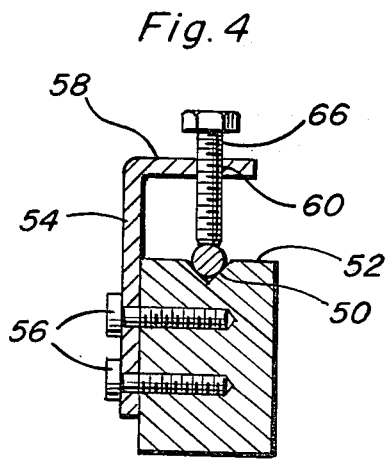
FIG. 4 is an enlarged sectional view taken substantially upon the plane indicated by the section line 4—4 of FIG. 2.
Figure 5:
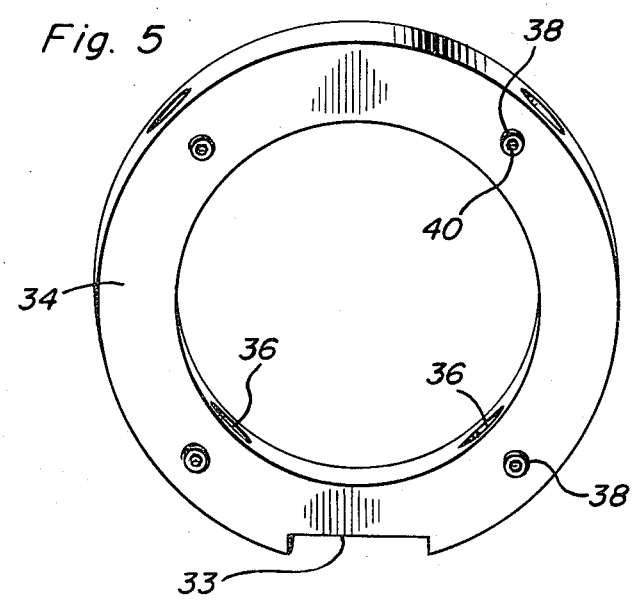
FIG. 5 is a perspective view of the support ring portion of the tool.

Referring now more specifically to the drawings, the numeral 10 generally designates the centering tool of the instant invention. The tool 10 includes a horizontal cylindrical disc-shaped base 12 having a central upstanding blind bore 14 formed therein. The lower diametrically reduced end portion 16 of a standard 18 is seated within the blind bore 14 and the shank 18 also includes a diametrically reduced upper end portion 20.

A support referred to in general by the reference numeral 22 is provided and includes a first upwardly opening semi-circular part 24 including a blind bore 26 in which the upper end portion 20 is seated. The blind bore 26 is disposed substantially on a radius of curvature of the semi-circular part 24 and opens radially outwardly of the convex outer surface 30 of the part 24 centrally intermediate the opposite arc ends thereof. The inner central portion of the part 24 includes a transverse notch 32 formed therein in which one notched peripheral portion 33 of an annular second part 34 of the support 22 is removably secured by a set screw 36 threadedly engaged in a bore 38 provided therefor in the first part 24 and opening laterally into the central portion of the notch 32.

The second part 34 includes four equally angularly displaced radial bores 36 formed therein into which small diameter threaded bores 38 having set screws 40 threadedly engaged therein open.

Four micrometer assemblies referred to in general by the reference numeral 42 are provided and each micrometer assembly includes a spindle 44, a sleeve 46 and a thimble 48. The sleeves 46 of the micrometer assemblies 42 are releasably secured in adjusted axially displaced positions within the bores 36 through the utilization of the set screws 40.

Each of the free ends of the semi-circular first part 24 includes a V-shaped notch 50 formed therein which opens laterally through the corresponding arc end face 52 of the first part 24. The end faces 52 of the first part 24 are disposed substantially in a diametric plane of the second part 34 which passes through the center of curvature of the second part 34. In addition, each end of the first part 24 includes an L-shaped bracket 54 secured thereto through the utilization of removable fasteners 56 and each bracket 54 includes a flange portion 58 thereof which is laterally spaced from and opposes the corresponding end face 52. Each flange portion 58 is provided with a threaded bore 60 formed therethrough and each bore 60 has a clamp screw 66 threadedly engaged therein disposed at substantially right angles to the corresponding notch 50 and axially aligned with the center of the corresponding notch 50.

In operation, a dowel pin may have its opposite ends secured in the notches or grooves 50. Thereafter the set screws 40 are loosened, the thimbles 48 are set on zero and the micrometer assemblies 42 are shifted inwardly of the bores 36 until the free ends of the spindles 44 abut against the dowel pin projecting through the medial plane of the second part 34. Then, the set screws 40 are tightened in order to secure the micrometer assemblies 42 in position. Thereafter, the thimbles 48 may be backed off in order to retract the spindles 44 and a pair of dop sticks of the same diameter as the dowel pin may be mounted in the notches with a gem stone 72 to be mounted on one of the dop sticks 70 disposed between the adjacent dop stick ends and centered relative thereto by adjusting the thimbles 48 until the gem stone 72 is properly centered. In this manner, the gem stone will be supported in centered position relative to the center axis of the dop stick 70. Thereafter, the clamp screw 66 supporting one of the dop sticks 70 may be loosened and that dop stick 70 may be shifted along the corresponding groove or notch 50 until the free end of the dop stick 70 engages the gem stone 72 to be supported therefrom and the gem stone 72 may be mounted on the dop stick 70 in the usual manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A centering tool for centering a gem stone or the like on a dop stick end, said tool including a support defining abutment surface means from which one end portion of the dop stick may be supported in position paralleling a predetermined axis against lateral displacement in any direction and for axial shifting relative to said support as desired, said support defining at least three mounting locations spaced about said axis and generally disposed in a plane normal to said axis and spaced therealong from said abutment surface means, an elongated measuring member supported from each of said mounting locations and extending substantially along a corresponding radius of said predetermined axis, said measuring members each being supported from the corresponding mounting location for adjustable shifting along the corresponding radius, said measuring members comprising micrometer assemblies including spindle, mounting sleeve and thimble portions, said mounting sleeve portions being supported from said mounting location for adjustable shifting along the corresponding radii of said predetermined axes, said micrometer assemblies each including zero settings.

2. The tool of claim 1 wherein said support includes four mounting locations equally spaced about said axis.

3. The tool of claim 2 wherein said support includes a circular support ring portion disposed normal to said plane and said four mounting locations are defined by and spaced about said support ring portion.

4. The tool of claim 3 wherein said mounting locations are spaced equally circumferentially about said support ring portion and comprise radial bores formed in said support ring portion in which the mounting sleeve portions of said micrometer assemblies are secured for adjustable axial shifting therein.

5. A centering tool for centering a gem stone or the like on a dop stick end, said tool including a support defining abutment surface means from which one end portion of the dop stick may be supported in position paralleling a predetermined axis against lateral displacement in any direction and for axial shifting relative to said support as desired, said support defining at least three mounting locations spaced about said axis and generally disposed in a plane normal to said axis and spaced therealong from said abutment surface means, an elongated measuring member supported from each of said mounting locations and extending substantially along a corresponding radius of said predetermined axis, said measuring members each being supported from the corresponding mounting location for adjustable shifting along the corresponding radius, said measuring members comprising micrometer assemblies including spindle, mounting sleeve and thimble portions, said mounting sleeve portions being supported from said mounting locations, said support including four mounting locations equally spaced about said axis, said support including a circular support ring portion disposed normal to said plane, said four mounting locations being defined by an spaced about said support ring portion, said mounting locations being spaced equally circumferentially about said support ring portion and comprising radial bores formed in said support ring portion in which the mounting sleeve portions of said micrometer assemblies are secured for adjustable axial shifting therein, said support including a semi-circular support member from whose arc midportion a peripheral portion of said support ring portion is supported, the axes of curvature of said semi-circular member and circular ring portion at least substantially intersecting at right angles relative to each other, said abutment surface means being disposed at one arc end of said semi-circular member.

6. The combination of claim 5 wherein the other arc end of said semi-circular member defines second abutment surface means from which one end portion of a dop stick may be supported in position paralleling said predetermined axis against lateral displacement in any direction and for axial shifting relative to said support as desired.

7. The tool of claim 6 wherein said abutment surface means each comprise a V-shaped groove paralleling said predetermined axis and opening laterally outwardly of the arc ends of said semi-circular member.

8. A centering tool for centering a gem stone or the like on a dop stick end, said tool including a support defining abutment surface means from which one end portion of the dop stick may be supported in position paralleling a predetermined axis against lateral displacement in any direction and for axial shifting relative to said support as desired, said support defining at least three mounting locations spaced about said axis and generally disposed in a plane normal to said axis and spaced therealong from said abutment surface means, and an elongated measuring member supported from each of said mounting locations and extending substantially along a corresponding radius of said predetermined axis, said measuring members each being supported from the corresponding mounting location for adjustable shifting along the corresponding radius, said measuring members comprising micrometer assemblies including spindle, mounting sleeve and thimble portions, said mounting sleeve portions being supported from said mounting locations, said support including a circular support ring portion disposed normal to said plane, said mounting locations being defined by an spaced about said support ring portion, said mounting locations being spaced equally circumferentially about said support ring portion and comprising radial bores formed in said support ring portion in which the mounting sleeve portions of said micrometer assemblies are secured for adjustable axial shifting therein, said support including a semi-circular support member from whose arc midportion a peripheral portion of said support ring portion is supported, the axes of curvature of said semi-cylindrical member and circular ring portion at least substantially intersecting at right angles relative to each other, said abutment surface means being disposed at one arc end of said semi-circular member.

* * * * *